May 14, 1946.                W. M. HALL                2,400,232
           METHOD OF AND INSTRUMENT FOR GUIDING AIRCRAFT
                  Filed Dec. 10, 1938      7 Sheets-Sheet 1

Inventor:
William M. Hall,
By Potter, Pierce & Scheffler,
Attorneys.

| Aircraft | Visual | Fig. 11. Gyro | Fig. 11. Radio | Fig. 12 |
|---|---|---|---|---|
| A1 | | | | |
| A2 | | | | |
| A3 | | | | |
| A4 | | | | |
| A5 | | | | |
| A6 | | | | |
| A7 | | | | |
| A8 | | | | |
| A9 | | | | |

Fig. 5.

May 14, 1946.　　　　W. M. HALL　　　　2,400,232
METHOD OF AND INSTRUMENT FOR GUIDING AIRCRAFT
Filed Dec. 10, 1938　　　7 Sheets-Sheet 4

Inventor:
William M. Hall,
By Potter, Pierce & Scheffler,
Attorneys.

Patented May 14, 1946

2,400,232

UNITED STATES PATENT OFFICE 2,400,232

METHOD OF AND INSTRUMENT FOR GUIDING AIRCRAFT

William M. Hall, Lexington, Mass., assignor to Research Corporation, New York, N. Y., a corporation of New York Application December 10, 1938, Serial No. 245,028

15 Claims. (Cl. 250—11)

This invention relates to methods of and instruments for guiding aircraft and particularly to methods of and instruments for continuously affording to the pilot full information both as to the location of the aircraft with respect to a reference point or line and as to the orientation or attitude of the aircraft.

The instruments of this invention are intended primarily for the blind landing of aircraft at night and/or under adverse conditions that preclude a view of the landing field, but the complete apparatus may include instrumentalities that adapt the instruments for use in route flying to a distant airport. The methods and apparatus are characterized by the production, on a single instrument, of visual indications that are significant of both the location and the orientation of the aircraft. For convenience, the term "location" will be used hereinafter to connote the coordinates of an arbitrary reference point on the aircraft with respect to a desired linear approach path to the landing field. The term "orientation" will be used to connote rotations of the aircraft about its vertical, transverse, and longitudinal axes. These rotations will be referred to respectively as yaw, pitch, and bank or roll. The reference axes of the coordinate systems used to define the location and orientation of the aircraft will be discussed in greater detail subsequently.

Information as to the location of the aircraft may be obtained from devices responsive to radiant energy emanated from the landing field, and information as to the orientation of the aircraft may be derived from gyroscopic instruments on the aircraft. The blind landing systems now in use require the pilot to correlate information derived from different devices or instruments but the present invention contemplates a correlation of information from different sources for visual display on a single instrument in such manner as to indicate both the location and the orientation of the aircraft.

A landing system developed by Mr. Irving R. Metcalf of the Bureau of Air Commerce is based upon the proposition that information as to the location and the orientation of the aircraft can be obtained by an observation of three markers or lights on the landing field; one marker or light being at the desired point of contact of the aircraft with the ground or water, and the other markers or lights being at elevated positions in the desired approach plane and symmetrically located at opposite sides of the first marker or light. The three points determine the approach plane and, when the aircraft moves along the desired landing path and with its transverse axis parallel to the ground, the three markers or lights are seen in alinement parallel to the transverse axis of the aircraft with the ground point midway between the two elevated points. The landing path defined in this way by the three markers will henceforward be referred to as the reference landing path. Vertical displacements of the aircraft from the reference landing path result in a vertical displacement of the central marker or light, as viewed from the aircraft, from a line joining the outer markers or lights, and a transverse displacement of the aircraft from the reference landing path results in an asymmetrical location of the central marker or light with respect to the outer markers or lights. If the aircraft is banked as it approaches the field, the two outer markers or lights do not appear parallel to the transverse axis of the aircraft. If the aircraft is turned, so that it is no longer headed toward the landing field, the markers no longer appear directly in front. An observation of three suitably disposed markers or lights thus informs the pilot as to the location and the orientation of the aircraft.

Objects of this invention are to provide methods of and apparatus for producing, on the aircraft, visual indications that are the broad equivalent of the direct visual image of three markers or lights arranged, as stated above, at the landing field. Other objects of the invention are to provide methods of and apparatus for producing forces, particularly electrical voltages, that vary with the departure of an aircraft, as to position and as to orientation, from a preselected path of travel, such forces being utilized to indicate the location and orientation of the aircraft with respect to the preselected path and/or to actuate a control device to return the aircraft to the desired path of travel. Objects are to provide methods of and apparatus for producing on a single instrument indications of both the location and the orientation of the aircraft. Further objects are to provide methods of and apparatus for correlating from different sources data to produce on one instrument, which may be a cathode ray tube, visual indications that simulate an actual observation of three points at the landing field. More specifically, an object is to provide apparatus including a single indicating device, a receiver for radiant energy emanated from the landing field, one or more gyroscopically controlled potentiometers on the aircraft, and circuits connecting the receiver and the potentiometer or potentiometers to the indicating device to produce visual images indicative of the location and the orientation of the aircraft.

These and other objects and advantages of the invention will be apparent from the following specification when taken with the accompanying drawings in which.

Figure 1:
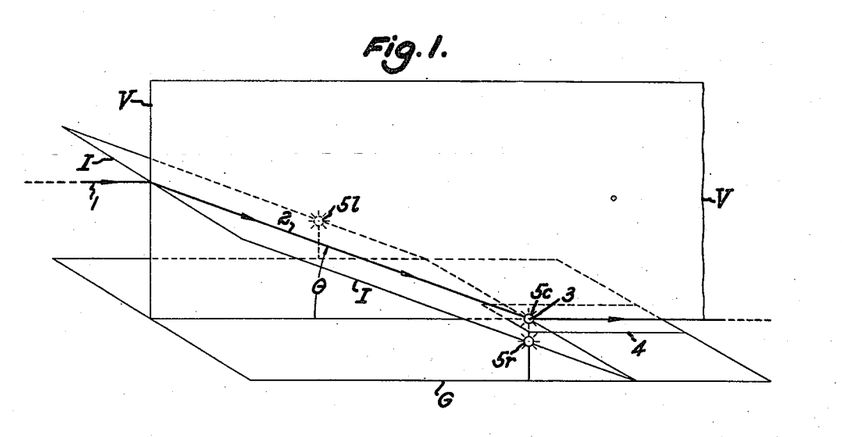
Figs. 1 and 2 are schematic perspective views of a landing field showing, respectively, planes that determine the desired approach path for the aircraft, and radiators of crossed beams for producing in space field patterns that are of equal strength at points along the intersections of those planes.
Figure 2:
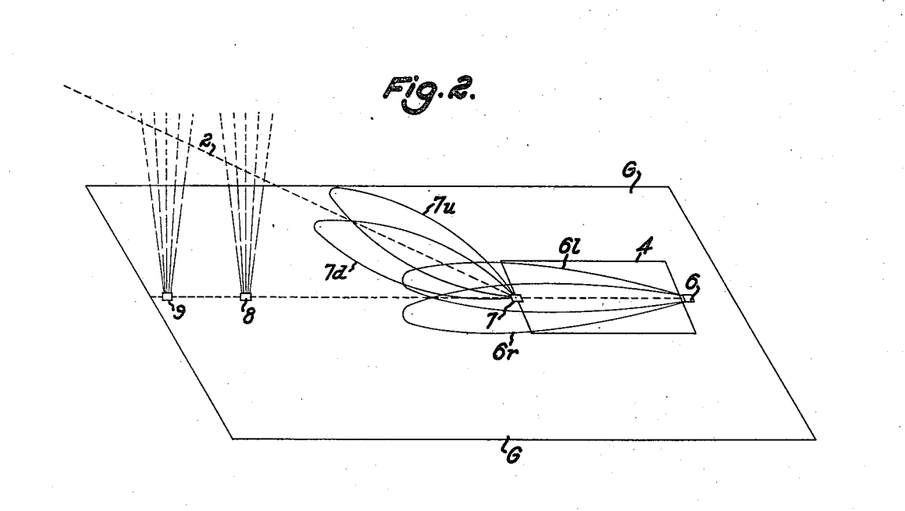

In the drawings, the reference character G identifies a horizontal plane including the ground or water surface of a landing field, which an aircraft approaching along a path 1 should preferably reach by the inclined path 2 to contact the surface G at a point 3 which, in the case of a ground field, may be near the outer edge of the runway or field 4. The inclined approach path 2 lies at the intersection of a vertical reference plane V through the center of the field runway and an inclined reference plane I. The pilot may determine the location of the aircraft with respect to the reference approach path 2, and the orientation of the aircraft, by observation of a marker or light 5c located at the desired ground contact point 3 and markers or lights 5r, 5l located at elevated points in the plane I at the right and left side, respectively, of the central marker or light 5c. As shown in Fig. 2, the desired or reference approach path 2 may be established in space by a radiator 6 which emanates a pair of crossed beams indicated by the patterns 6r and 6l of the right and left beams, and a radiator 7 that emanates an inclined "up" beam 7u and an inclined "down" beam 7d. The radiators may be of the infra-red or radio type and, for convenience of description, will be hereinafter referred to as of the radio type. Marker beacons 8, 9 may be arranged, as is customary, at some distance from the landing field to afford the pilot an indication of his distance from the field.

Figure 3:
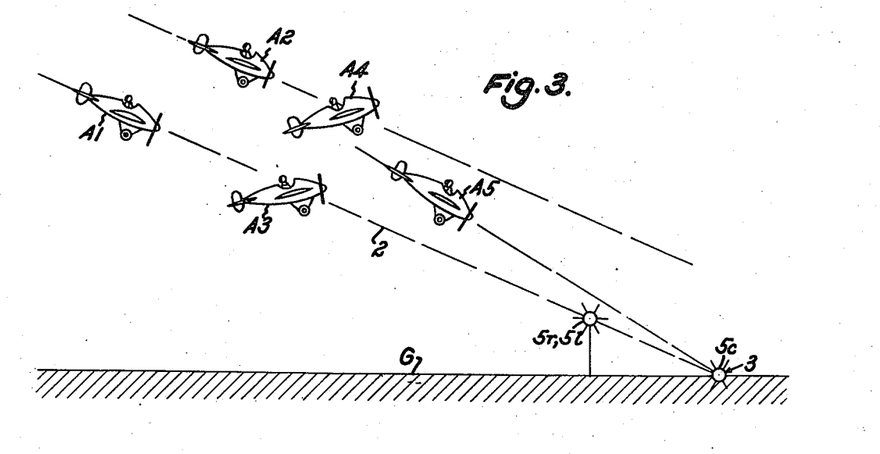
Figs. 3 and 4 are side and plan views, respectively, showing airplanes in different positions and different attitudes with respect to the desired landing path.
Figure 4:
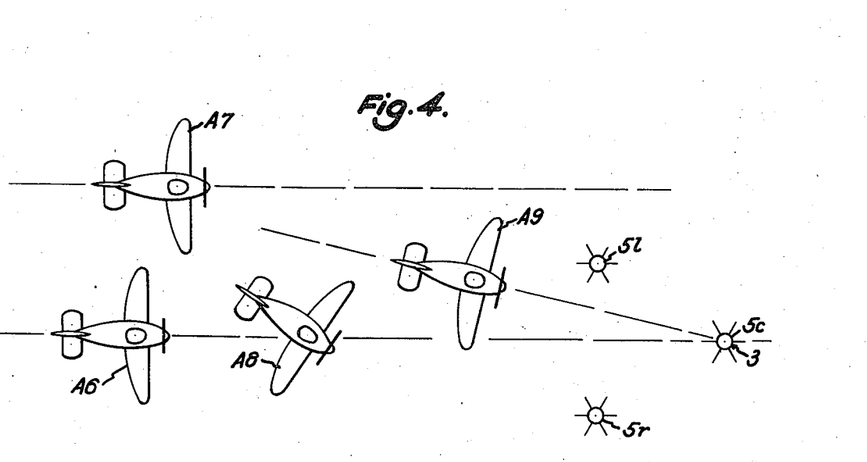

The aircraft in different locations in the vertical reference plane V and at different pitch angles is indicated by the aircraft A1—A5 of Fig. 3. The transverse axis of the aircraft in all illustrated positions is horizontal and the longitudinal axis is parallel to the landing or vertical reference plane. For convenience in illustrating the operation of the invention, it is assumed that the pitch orientation for landing places the longitudinal axis of the aircraft parallel to the reference line 2, as shown for aircraft A1. In practice, the pitch orientation for landing will depend upon the particular aircraft and, for a given aircraft, the effect of pitch orientation may be adjusted by raising or lowering the horizontal reference line on the window through which the markers are directly viewed or, with the apparatus of this invention, by a vertical displacement of the visual indications with respect to a fixed horizontal reference line. The aircraft A6—A9 of Fig. 4 are illustrated in different locations in the inclined reference plane I and in different attitudes or yaw orientations with respect to the desired reference path or line 2. The pitch orientation is assumed to be correct for normal landing.

Figure 5:
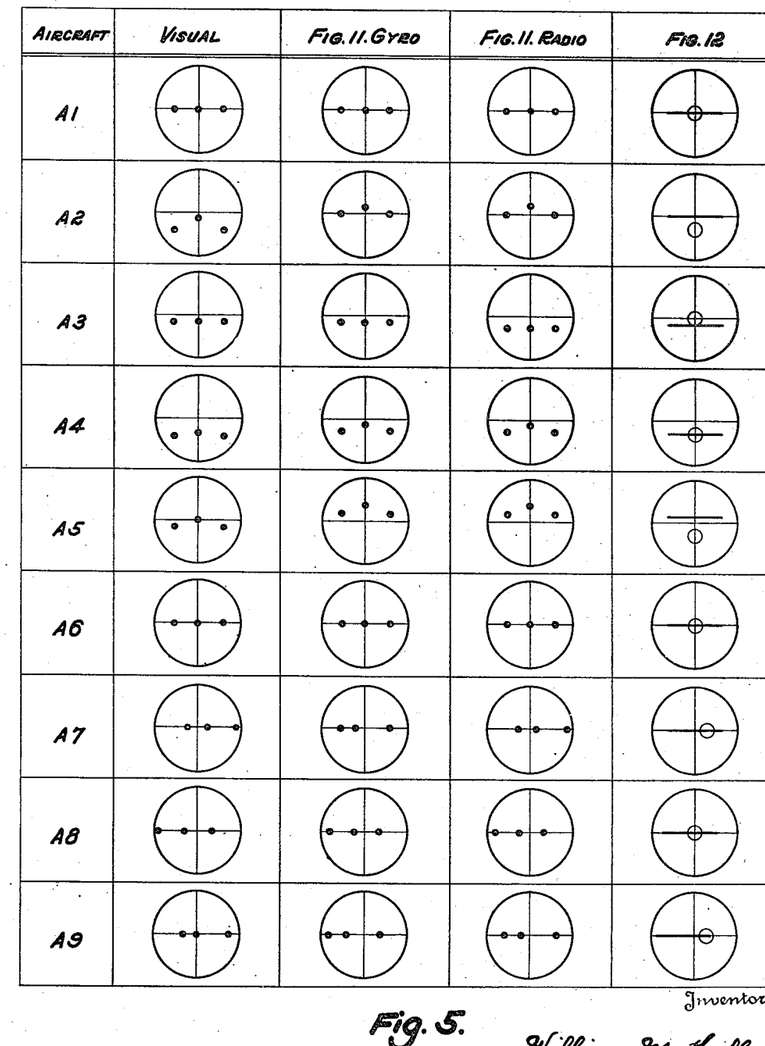
Fig. 5 is a tabulation showing the direct visual images of the landing markers as seen from the aircraft shown in Figs. 3 and 4, and the corresponding images produced by different embodiments of the invention.

The first column of the tabulation of Fig. 5 comprises the characters A1 to A9 identifying the several aircraft of Figs. 3 and 4, and the second column shows the corresponding locations, as viewed from the aircraft through a circular window having inscribed horizontal and vertical reference lines, of the markers or lights 5c, 5r and 5l. Detailed explanation of the geometrical relationships that result in the illustrated images is deemed unnecessary. It may be noted, however, that the pilot on the aircraft A1 of Fig. 3 or aircraft A6 of Fig. 4 will see the three markers in horizontal alinement, equally spaced and with the central marker at the intersection of the reference lines of the circular window. Such a view of the markers indicates that the aircraft is located on the desired reference landing path 2, with proper climb orientation for a normal landing, and with its longitudinal axis directed towards the landing point 3 or central marker 5c. All other locations and/or orientations of the aircraft will result in patterns in which one or more of the marker images are displaced from these ideal locations. The tabulation does not include image patterns corresponding to a bank but it will be apparent that this condition produces an angular displacement of the image pattern with respect to the horizontal reference line.

Figure 6:
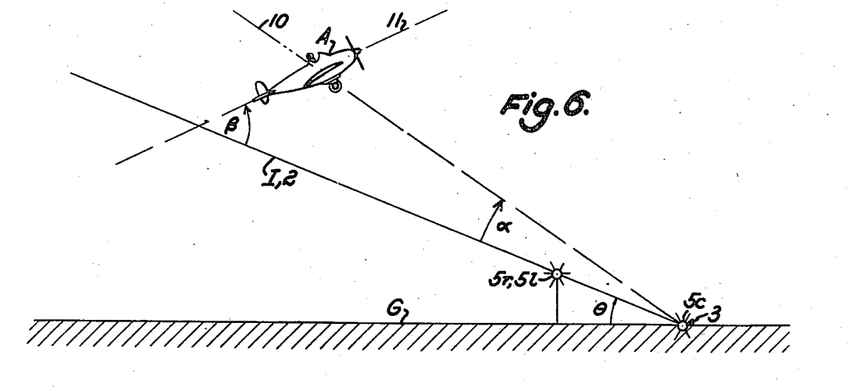
Figs. 6, 7 and 8 are side, plan and end elevations, respectively, of an airplane in different locations and orientations with relation to the landing field.
Figure 7:
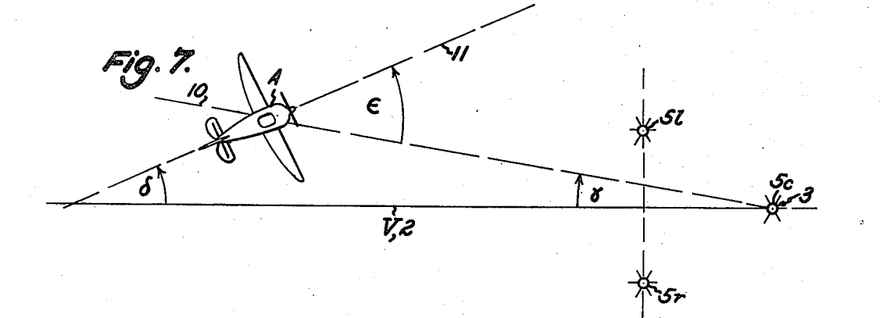
Figure 8:
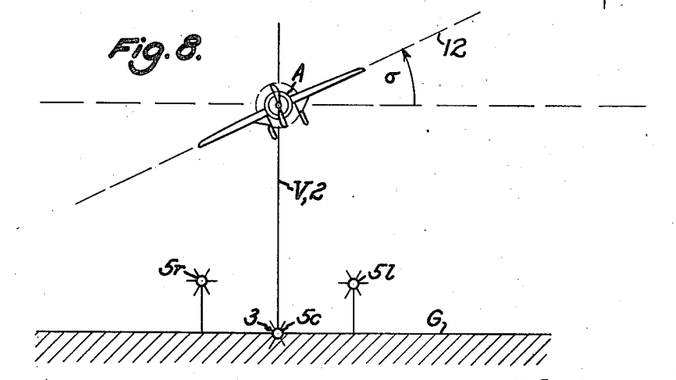

The image pattern of the markers at the landing field thus varies with the location and orientation of the aircraft, and these factors may be described, with respect to the reference line 2 and ground contact point 3, in terms of the several angles indicated in Figs. 6 to 8. Known devices afford indications or displacements that vary with these significant angles and such devices are correlated, in accordance with this invention, to produce on a single device visual images that are indicative of the location and orientation of the aircraft, the visual images in some instances approximating a direct visual observation of the three markers of Fig. 1.

As viewed in side elevation, Fig. 6, the angle $\alpha$ between the reference landing path or line 2 and a line 10 from the aircraft A to the ground point 3 gives the direction and magnitude of vertical displacement of the aircraft from the inclined reference plane I. The climb orientation or pitch angle of the aircraft, i. e. its rotation about its transverse axis, is determined by the angle $\beta$ between the line 2 and the longitudinal axis 11 of the aircraft. The angle $\gamma$, Fig. 7, is a measure of the location of the aircraft with respect to the vertical plane through the reference line 2, that is, with respect to the center line of the runway. The angle $\delta$ between the reference plane V and the longitudinal axis 11 of the aircraft is a measure of the yaw attitude or rotation of the aircraft about its vertical axis. The angle ε between the longitudinal axis 11 and line 10 from the aircraft to the ground point 3 is also a measure of the yaw attitude of the aircraft. The bank or rotation of the aircraft about its longitudinal axis 11 is measured by the angle σ between the transverse axis 12 of the aircraft and a horizontal line H, Fig. 8.

Consideration of the geometry of Figs. 6 to 8 will show that the appearance of the three markers 5c, 5r and 5l, as viewed through a window in the nose of the aircraft, is affected by the several indicated angles. Changes in the angles α and γ alter the apparent location of the markers with respect to each other and also alter the location of the markers with respect to reference lines on the window. Devices that respond to the relative intensities of crossed radio or infra-red beams may be used to provide electrical signals proportional to the angles α and γ; the beams for measuring the angle α having their axes in the vertical reference plane V and the beams for measuring the angle γ having their axes in a horizontal plane. The angles β and δ have no effect upon the position of the marker images with respect to each other but produce apparent movements of the spot images in a vertical and a horizontal direction, respectively. Angle β may be measured by a gyroscopic bank-and-climb indicator and angle δ may be measured by a directional gyro that is set so that its zero reference direction corresponds to the direction of the landing reference path 2. The angle ε also affects an apparent horizontal displacement of the spot images, and may be measured by a homing radio compass. The effect of roll or angle σ is to rotate the entire spot pattern about the center of the field of vision. This angle and electrical signals proportional thereto may be obtained from a bank-and-climb gyroscope.

Control systems or apparatus for correlating electrical impulses from the stated aircraft instruments to produce indications with an electronic indicating device of the general type of a cathode ray oscillograph are shown diagrammatically in Figs. 9 to 12. The illustrated tube is of the single gun type and a commutating switch system is employed to control the electron beam by different factors to produce continuously visible indications of two or more luminescent spots or lines. A multiple-gun type of cathode ray tube that produces simultaneously a plurality of electron beams may be used, thus eliminating the commutating system, but to avoid complication in describing the operation of the invention, only the circuit utilizing a single-gun tube will be described.

A general statement of the method of operation of the apparatus is here presented in advance of the description of typical embodiments of the invention. For indications of location, voltages are required that are proportional to the angles α and γ which indicate the angular departure, as viewed in elevation and in plan, of the aircraft from the landing reference path 2. The path 2 is determined in space as the line of equal field intensity of the crossed beams emanated from the infra-red or radio wave radiators 6, 7 of Fig. 2. An automatic volume control type of receiver on the aircraft will provide an output voltage proportional to the relative intensities of the pairs of crossed beams. Control voltages indicative of the bank-and-climb orientation of the aircraft may be obtained from the gyro horizon or the bank-and-climb element of the automatic pilot. These voltages are produced by the movable element of the gyro displacing a fine resilient wire contact along a potentiometer resistance mounted on a relatively stationary part of the gyroscope. Various other types of electrical take-off, such as photoelectric or capacitive, may be used to reduce the frictional load on the gyro to a substantially negligible amount; however, it has not heretofore been appreciated that a negligible error is introduced by the frictional load produced by a sliding wire contact of proper construction.

Figure 9:
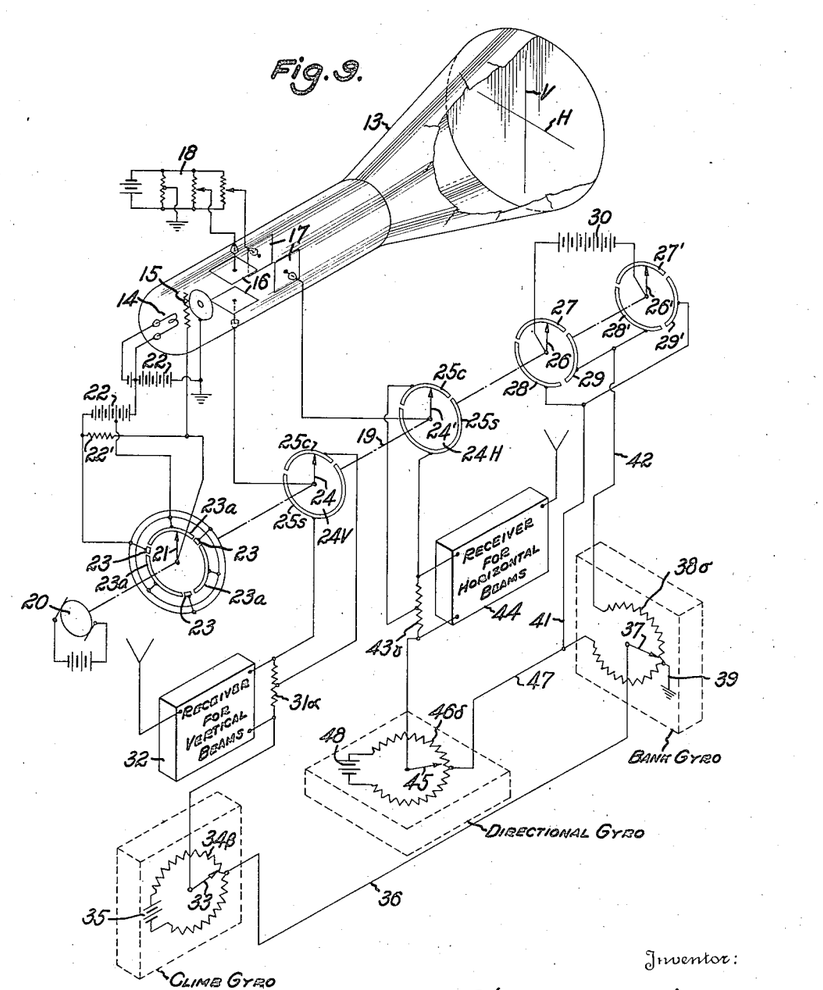
Figs. 9 to 12, inclusive, are circuit diagrams of embodiments of the invention.

In Fig. 9, the cathode ray tube 13 has an electron gun 14, and pairs of vertical and horizontal deflecting plates 16, 17, respectively, for controlling the path of the electron beam to the fluorescent end wall of the tube which carries the reference lines V, H. The electron gun has as one of its elements a control grid 15. It may also have additional electrodes, according to current practice, but for the purpose of explaining the operation of the invention these are not shown. One plate of each set is connected to ground through a resistance network 18 that is adjustable for centering the beam when all signal voltages are removed.

The beam is controlled in rapid succession by three sets of deflecting voltages by a commutator system that is shown, for greater clarity of illustration, as a multiple rotary switch but which, in practice, may be a vacuum tube arrangement for electronic switching or an assembly of cam actuated single-pole double-throw flat spring switches similar to the telephone jack type of switch. The rotary commutator comprises a plurality of contact arms on a shaft 19 that is rotated by a motor 20 at a rate of not less than about 20 revolutions per second to produce three continuously visual spot images. Contact arm 21 is connected to the grid 15, and sweeps over contact segments 23 and 23a. Segments 23 are in axial alinement with the gaps in the segments of switches that commutate the beam control voltages; segments 23a are between segments 23. The segments 23 are connected to the cathode through a bias battery 22, the voltage of this battery being sufficient to suppress the electron beam during commutation from one set of control voltages to another. The segments 23a are connected to the cathode of the electron gun 14 through a part of bias battery 22, the voltage of that part of the battery being properly chosen to allow a suitable spot to be formed on the screen of the tube. A resistor 22' connects the arm 21 to the segments 23, to prevent the grid from becoming totally disconnected as the arm 21 moves from segments 23a to segments 23. Contact arms 24, 24' of similar switches 24V, 24H are connected, respectively, to a vertical plate 16 and a horizontal deflecting plate of the tube. Each of these switches has a segmental contact 25c of about 120° angular extent and a longer contact 25s of about 240° angular extent. The center spot image is formed when the contact arms 24, 24' engage their contacts 25c and the two side spots are formed when the contact arms engage the longer contacts 25s. Polarity reversing switches for producing the side spots comprise contact arms 26, 26' that move over three similarly disposed contact segments 27—29, 27'—29', respectively, of about 120° angular extent. Contact arms 26, 26' are connected to the opposite terminals of a battery or current source 30. Contacts 27, 27' are open or dead contacts in axial alinement with the contact 25c of the control voltage switches as battery 30 is not employed in the formation of the center spot image.

Contact segment 25c of the switch 24V is connected to an intermediate point of the output resistance 31α of a receiver 32 for the vertically arranged and crossed beams emanated from the radiator 7 of Fig. 2, and segment 25s is connected to one end of the resistance 31α. The significance of the Greek letter subscript to reference numeral identifying the output resistor of receiver 32 is that the voltage developed across this resistor is proportional to the angle α of Fig. 6. In similar manner, other subscripts will be used to indicate the relationship of signal voltage sources to the angles of Figs. 6 to 8.

The other terminal of the resistor 31α is connected to the contact wire 33 that is displaced by a bank-and-climb gyroscope along the "climb" resistor 34β that is secured to the gyroscope frame, the resistor 34β being connected across a current source 35. The midpoint of the resistor 34β is connected by lead 36 to the slide wire contact 37 that is moved by a bank-and-climb gyro device along the fixed resistor 38σ in response to the inclination of the transverse axis of the aircraft. The midpoint of resistor 38σ is grounded and the terminals of the resistor are connected by leads 41, 42, respectively, to the contact segments 28, 29' and 28', 29 of the polarity reversing switches.

Contact 25c of the switch 24H is connected to a point on the output resistor 43γ of the receiver 44 for the crossed beams emanating from the radiator 6 of Fig. 2, and contact 25s is connected to one terminal of the resistor 43γ. The other terminal is connected to the slide wire 45 that is displaced along a fixed resistor or potentiometer 46δ by a directional gyro instrument. The midpoint of the resistor is connected by a lead 47 to one terminal of resistor 38σ and a current source 48 is connected across the terminals of resistor 46δ.

The method of operation of the Fig. 9 apparatus is as follows. The commutating switch system is continuously actuated by motor 20 to apply three sets of control voltages to the deflecting plates of the cathode ray tube. As illustrated, the several contact arms are positioned for the production of the central spot image. The control circuit of the vertical deflecting plate may be traced from contact arm 24 and segment 25c of switch 24V through a part of the resistor 31α, the climb potentiometer 34β and the bank potentiometer 38σ. The control voltage thus applied to the deflecting plate 16 comprises a fraction of the voltage indicative of the angular displacement α of the aircraft from the inclined reference plane I and the voltage indicative of the pitch angle β of the aircraft. The bank angle σ does not affect the location of the central spot image since there is no voltage across the potentiometer 38σ when the central spot image is formed. Similarly, a tracing of the circuit from the horizontal deflecting plate 17 will show that the applied control voltage comprises a fraction of the voltage output of receiver 44, which output is indicative of the angular displacement γ of the aircraft from the vertical reference plane V, and a voltage component indicative of the yaw angle δ of the aircraft.

The electron beam is momentarily suppressed by engagement of contact arm 21 with a contact 23, thus placing a heavy negative bias on the control grid 15, as the contact arms 24, 24' of switches 24V, 24H move to contact segments 25s and the contact arms 26, 26' of the polarity reversing switches move to contact segments 28, 28', respectively. One of the side spot images is produced as soon as the contact arm 21 clears the contact 23. This image may be at the right or the left of the central spot depending upon the connections between the battery 30 and the contact arms 26, 26'. When the battery connections are such that the right hand spot is produced when contact arms 26, 26' engage segments 28, 28', respectively, the further rotation of the contact arms to engage segments 29, 29' will result in the production of the left hand spot image. The contact arms 24, 24' remain in engagement with their respective long segments 25s throughout the production of both side spots. The control voltage for vertical displacement of the side spots includes the full voltage output of the vertical beams receiver 32, as developed across its output resistor 31α, a voltage component from potentiometer 34β proportional to the pitch angle β of the aircraft, and a voltage component from potentiometer 38σ proportional to the bank angle σ of the aircraft. The polarity of the bank angle component is reversed as the contact arms 26, 26' pass from contacts 28, 28' to the contacts 29, 29', respectively. This polarity reversal results in a vertical displacement, in opposite directions, of the right and left side spot images and thus tilts the line joining the outer spots in accordance with the bank of the aircraft.

The reason for the application of the full output voltages of the beam receivers 32, 44 for the control of the outer spot images and the use of fractions of these voltages in the production of the central spot image is that the central marker 5c of Fig. 1 is more distant from the aircraft than the side markers 5r, 5l and therefore the pilot will observe the side markers moving at a more rapid rate than the central marker when the aircraft moves away from the reference landing line 2. The described circuit connections produce a similarly graduated deflection of the electron beam during the production of the center and the side spots and the pattern on the cathode ray tube thus simulates an actual view of three lights at the landing field.

The image patterns produced by the Fig. 9 apparatus are close approximations of a view of lights on the field. The spot pattern, whether an actual view or an instrument simulation, advises the pilot of the position and attitude of the aircraft. A spot pattern differing from the ideal patterns, as shown in Fig. 5 for aircraft A1 and A6, informs the pilot that the aircraft is not on the desired reference landing path or, if on the reference landing path, is not properly oriented for a normal landing. The pilot employs this information to manipulate the aircraft in such manner as to transform the observed pattern into the ideal pattern. The pilot is immediately advised of any erroneous maneuver as this will result in a further departure of the observed spot pattern from the ideal pattern.

Figure 10:
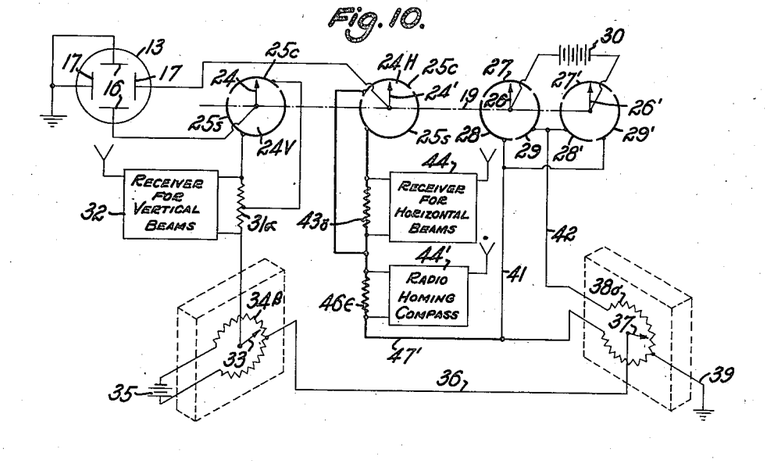

As shown in Fig. 10, a radio homing compass 44' may be used as the control device for producing the electrical voltages for displacing the spot images laterally in the formation of a pattern simulating a direct view of the three ground points. The apparatus may be substantially identical with that of Fig. 9 except as to those parts and/or connections which are shown in heavy line to facilitate a comparison of the systems. For simplicity, the motor and grid bias circuit elements and resistance network for adjusting the initial spot positions are omitted from this and other circuit diagrams. The contact segment 25c of commutator switch 24H is connected to the junction of the output resistance 43γ of the receiver for the crossed horizontal beams and the output resistance 46e of the radio homing compass. Contact segment 25s is connected to the other terminal of resistor 43γ, and the second terminal of resistor 46e is connected by leads 47' with 41 to one side of the bank gyro potentiometer 38σ.

The vertical deflections of the three spot images are produced by the devices and in the manner described above with reference to the Fig. 9 apparatus. All of the spots are moved horizontally at the same rate by a voltage component proportional to the angle ε, Fig. 7, as the resistor 46e is connected between the horizontal deflecting plate 17 and ground at all positions of the contact arm 24' of switch 24H. The deflecting voltage for the outer spots includes a second component proportional to the angle γ at the output resistor 43γ of the receiver for the horizontal beams is in series with resistor 46e when the contact arm 24' engages the contact segment 25s. The resultant image pattern is a close approximation of a direct view of three lights on the field.

The above described embodiments of the invention produce image patterns simulating a direct view of three lights by displacing the three spot images in accordance with combined voltages from the several gyroscopic instruments and the beam receivers. The general appearance and illusion of three landing lights may also be produced by spot patterns having separately legible indications of the location and the orientation of the aircraft. This method involves the movement of all spot images as a unit to simulate three spots on the horizontal bar of the gyro-horizon and, in addition, the displacement of all spots horizontally with the turning of the aircraft. The crossed beams which indicate position provide additional voltage components for moving only the center spot with respect to the side spots. Either a directional gyro or a radio homing compass may be used to supply the voltage component which is indicative of the turn of the aircraft and, to avoid duplication, the apparatus as shown in Fig. 11 includes both types of control devices and a switch for rendering either one operative.

Figure 11:
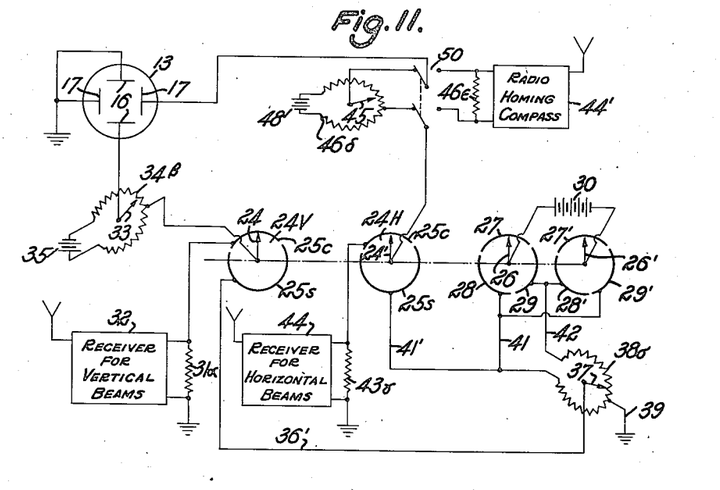

The component elements of the Fig. 11 apparatus are the same as those of Figs. 9 or 10, depending upon the selection of the directional gyro or the radio homing compass as the control device for indicating the orientation, as viewed in plan, of the longitudinal axis of the aircraft, but the circuit connections have been modified to provide the separately legible indications of location and orientation. The vertical deflecting plates 16 of the tube 13 is connected through the potentiometer 33, 34β of a climb gyro device to the contact arm 24 of the commutator switch 24V. Contact segments 25c of this switch is connected to ground through the output resistor 31α of the receiver 32 for the vertically crossed beams, and the contact segment 25s is connected by lead 36' to the tap 37 that is adjusted along the resistor 38σ by the bank indicating gyro device. The horizontal deflecting plate 17 is connected to one blade of a double pole, double throw switch 50 that may be adjusted to connect the plate 17 to the contact arm 24' of switch 24H either through the potentiometer 45, 46δ of a direc- tional gyro device or the output resistor 46e of the radio homing compass 44'. Contact 25c of switch 24H is grounded through the output resistor 43γ of the horizontal beams receiver 44, and contact 25s is connected by leads 41', 41 to one side of the resistor 38σ of the bank potentiometer. The polarity reversing circuits and switches between the current source 30 and the terminals of resistor 38σ may be the same as described with reference to Fig. 9.

Inspection of the circuits will show that the deflections of the side spot images are not affected by the voltage components from the crossed beams receivers. The position of the center spot is affected by these voltages and, in common with the side spots, by voltages proportional to the pitch angle β and a direction or yaw angle which is angle γ when the directional gyro is used and angle ε when the radio homing compass is used. The side spot images are also controlled by voltage components from the bank potentiometer 37, 38σ.

The image patterns produced by the Fig. 11 apparatus are shown in the third and fourth columns of Fig. 5; the headings "Fig. 11 Gyro" and "Fig. 11 Radio" indicating that the switch 50 was adjusted for control by the directional gyro or the radio homing compass, respectively. Comparison of these image patterns with those of the first column will show that the instrument duplicates the direct view pattern for the aircraft A1 and A6, that is, when the aircraft is on and moving along the desired landing line at the pitch angle appropriate for a normal landing. The instrument image patterns depart from the direct view patterns when the aircraft is in other locations and/or orientations but, by proper interpretation, advise the pilot of the location and orientation of the aircraft. Appropriate guiding of the aircraft is continuously indicated as the path to be taken at any instant is that which will result in the production or the maintaining on the instrument screen of the ideal patterns of positions A1 and A6.

The several image patterns will not be discussed in detail but it may be noted that the directional gyro and radio homing compass produce patterns of different aspect for aircraft positions A7 and A9. The position of the central spot with respect to the side spots is the same for both types of control but the spot patterns differ as to the location of the spots with respect to the vertical reference line of the screen. The position of the center spot with respect to the side spots is indicative of location and should, of course, be the same for both types of control. Yaw orientation is indicated by the position of the side spots with respect to the center of the screen field. This position is dependent upon the type of control as the directional gyro measures the angle δ, Fig. 7, while the radio homing compass measures the angle ε. The positions of the outer spots as observed at aircraft A7 with the directional gyro control are symmetrical about the vertical line as a yaw orientation of zero will be indicated by the directional gyro, but the outer spots are displaced to the right when controlled by the radio homing compass as the aircraft A7 is not traveling towards the desired landing point. Conversely, a symmetrical image of the outer spots is indicated for aircraft A9 when the radio homing compass control is employed since the aircraft is headed for the desired landing point, but the spot positions produced by directional gyro control are not symmetrical since the aircraft is not moving parallel to the zero orientation of the directional gyro.

The three point pattern is not essential when separate indications of position and attitude are produced on a cathode ray tube screen. The image for indicating location may be a circle produced by applying alternating current voltages to the deflecting plates, the position of the circle with respect to the center of the screen being determined by direct current voltages derived from receivers for crossed beams; and the image for indicating orientation may be a bar produced by an applied alternating current voltage and controlled as to position by voltage components derived from a bank-and-climb gyro device and a directional device, i. e. a directional gyro or a radio homing compass.

Figure 12:
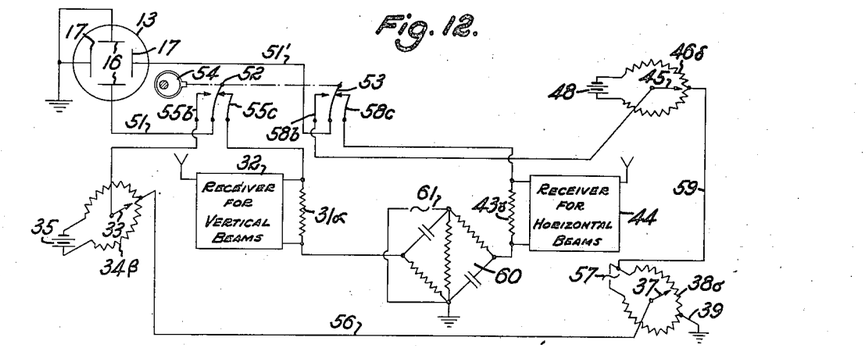

A system of this separately legible image type, as shown in Fig. 12, includes the cathode ray tube 13 having vertical deflecting plates 16 and horizontal deflecting plates 17, one plate of each set being grounded and the other plate being connected by leads 51, 51', respectively, to the contact arms 52, 53 of single pole, double-throw spring contact switches. The contact arms are operated in synchronism by a motor-driven cam 54 at a rate which results in two continuously visible images. Contact arm 52 of the vertical deflecting system engages contacts 55b, 55c alternately; contact 55b being connected to the contact 33 that is displaced by a pitch indicating gyro device along the resistor 34β. The midpoint of resistor 34β is connected by lead 56 to the movable contact 37 that is displaced along resistor 38σ by a bank indicating gyro device. The midpoint of resistor 38σ is grounded through lead 39 and an alternating current source 57 is connected across the resistor.

Contact arm 53 alternately engages contacts 58b, 58c to apply different control voltages to the horizontal deflecting plate 17. Contact 58b is connected to the contact 45 that is moved along resistor 46δ by a directional gyro device, and a direct current source 48 is connected across the resistor. The midpoint of the resistor is connected through lead 59 to one terminal of the resistor 38σ of the bank gyro device.

Contacts 55c, 58c of the switches are connected through the output resistors 31α, 43γ, respectively, of receivers 32, 44 for vertically and horizontally crossed beams, to the opposite terminals of a bridge circuit 60. An alternating current source 61 is connected across the conjugate terminals of the bridge, and one terminal of the current source and bridge is grounded.

The frequencies of the alternating current sources 57 and 61 are such that a straight line or bar image 62 is produced on the screen of tube 13 when the switch arms engage contacts 55b, 58b, and a circle image 63 is produced when the switch arms engage contacts 55c, 58c. An image 64 of the aircraft is preferably formed or affixed to the tube to facilitate the reading of the location of the bar and circle images with respect to the center of the screen. The circle image 63 is displaced by voltages derived from the crossed beam receivers 32, 44, and the bar image 62 is displaced vertically by a voltage component from potentiometer 33, 34β proportional to the climb angle of the aircraft and a voltage component from potentiometer 37, 38σ proportional to the bank of the aircraft. The bar image 62 is displaced laterally of the screen by a voltage component from potentiometer 45, 46δ proportional to the turn angle from the reference landing line 2. A voltage component from a radio homing compass may also be used to displace the bar laterally.

Figure 13:
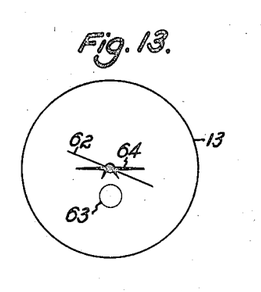
Fig. 13 is an end elevation of the cathode ray tube showing an image pattern produced by the apparatus of Fig. 12.

The image pattern as shown in Fig. 13 is produced when the aircraft is in the vertical reference plane V, but above the desired approach path 2 and in a left bank. Image patterns produced when the aircraft is in the several positions shown in Figs. 3 and 4 appear in the last column of Fig. 5. The vertical and horizontal reference lines are shown in this tabulation in place of the aircraft image 64 to avoid confusion of the bar image and the aircraft image. This confusion does not arise in actual use as the bar image is a brilliant line and the aircraft image is dark or a dark outline. The substitution of a radio homing compass control, for the directional gyro control of potentiometer 45, 46σ will result in some modification of the bar image position for the reasons stated above in the discussion of the three point image patterns obtained with the apparatus of Fig. 11 when set for control by the radio homing compass and by the directional gyro.

The invention is also useful during flight operations other than landing, and apparatus for such use may comprise separate assemblies for route flying between airports but, preferably, a single assembly and switching system is provided to obtain indications appropriate either for landing or route flying. Apparatus for producing route flying indications is distinguished, in general, from that for producing landing indications by the substitution of the customary radio range device for the receiver for the horizontally crossed beams, and by the absence of devices indicative of the orientation of the longitudinal axis of the aircraft (directional gyro or radio homing compass) and of the vertical displacement of the aircraft with reference to a desired path (landing reference path 2). This orientation indication is not essential in route flying nor is an up-down indication with reference to the landing path at the airport to which the aircraft is traveling. The elevation of the path in route flying is indicated by an altimeter and may be selected in accordance with the terrain and existing weather conditions. The altimeter may be used to control the up-down location of one of the indicating spots to enable the pilot to maintain level flight.

Figure 14:
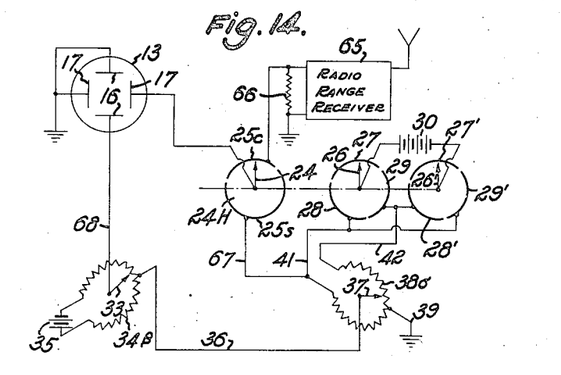
Fig. 14 is a fragmentary circuit diagram of another embodiment of the invention.

An embodiment of the invention for producing visual indications useful in route flying between airports is shown in Fig. 14. All of the elements of the apparatus are, or may be, identical with parts shown in Fig. 9 and are identified by corresponding reference numerals except that the radio range receiver 65, and its output resistor 66 must of course respond to the proper requirements for range use.

The contact segment 25c of the horizontal deflecting control switch 24H is connected to ground through the resistor 66 of the radio homing compass 65, and the segment 25s is connected by lead 67 to one terminal of the bank indicating resistor 38σ. A vertical deflecting plate 16 of the tube 13 is connected by lead 68 to the movable contact arm 33 of the pitch indicating resistor 34β.

Figure 15:
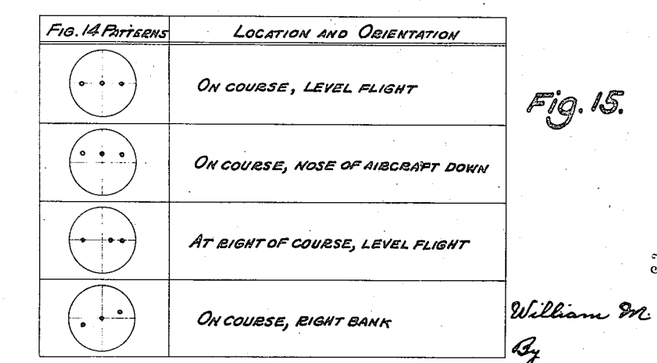
Fig. 15 is a tabulation of image patterns obtained with the Fig. 14 apparatus.

The center spot image is thus deflected vertically in accordance with the pitch angle of the aircraft and is deflected horizontally in accordance with the location of the aircraft to the right or left of the vertical plane established by the radio range beams. The side spots are moved in response to the pitch angle and the bank angle of the aircraft. Typical image patterns produced by the Fig. 14 apparatus are shown in the tabulation of Fig. 15.

A more detailed description of the methods and apparatus of this invention is presented in the report, dated June 1, 1938, to the Bureau of Air Commerce entitled "Blind Landing Apparatus and System" by Massachusetts Institute of Technology. Experimental data, descriptions of physical constructions of the several elements as above described and of preferred forms of auxiliary equipment for emanating crossed radio or infra-red beams from the landing field are set forth in the report and reference may be had, if desired, to the report for further information as to the invention.

It is to be understood that the embodiments as herein shown and described are typical of the invention and that there is considerable latitude in the design and construction of apparatus which functions in accordance wtih the novel method of producing, on a single instrument, visual indications significant of the position and the attitude of an aircraft. For example, separate receivers 32, 44 have been illustrated for the vertically and the horizontally crossed beams emanated from the radiators 7, 6, respectively, of Fig. 2, but a single receiver may be employed when the same carrier frequency is used for all beams and four modulating frequencies serve to distinguish the several beams from each other.

The described embodiments of the apparatus include an indicating device that is energized by the voltages that are significant of the location and orientation of the aircraft but it is apparent that the produced voltages may be utilized to energize devices that control the aircraft. Robot or automatic control devices are known and the manner in which the several voltages may be used to actuate such control devices will be apparent to those skilled in the art. It is broadly new, so far as I am aware, to provide methods of and apparatus for producing on an aircraft visual images which are controlled, either jointly or severally, by gyroscopic orientation indicating devices on the aircraft and by location indicating devices involving radiations to or from the aircraft, specifically devices responsive to radiations emanating from the landing field. It is therefore to be understood that instruments and apparatus that differ from the embodiments herein illustrated fall within the spirit of my invention as set forth in the following claims.

I claim:

1. In the guiding of an aircraft to a landing field, the method which comprises producing on the aircraft a plurality of visual images indicative by their locations with respect to each other of the position and the attitude of the aircraft, and substantially simultaneosly controlling the locations of said plurality of visual images jointly in accordance with energy radiated from the landing field and with energy developed on the aircraft to indicate the position of the aircraft with reference to a preselected approach path and the orientation of the aircraft with respect to a plurality of its axes.

2. In the guiding of an aircraft carrying a gyroscopic device indicative of an orientation factor, the method which comprises producing on the aircraft a plurality of visual images indicative by their locations with respect to each other of the position and the attitude of the aircraft, and controlling the location of each of said visual images jointly in accordance with said gyroscopic device and with energy radiated from the landing field.

3. In the operation on an aircraft of guiding apparatus including a cathode ray tube, a receiver for crossed beams radiated from a landing field, and a gyroscopic device; the method which comprises producing on the cathode ray tube a plurality of continuously visible images, and selectively controlling the displacements of the several images jointly in accordance with electrical voltages developed respectively by said receiver and by said gyroscopic device.

4. In the operation on an aircraft of guiding apparatus including a cathode ray tube, a receiver for crossed beams radiated from a landing field, and a gyroscopic bank-and-climb device; the method which comprises forming three continuously visible spot images on the screen of the cathode ray tube, producing control voltages from said receiver and said gyroscopic device, and displacing the several spot images jointly by said control voltages.

5. In the operation on an aircraft of guiding apparatus including a cathode ray tube, a receiver for crossed beams radiated from a landing field, and a gyroscopic bank-and-climb device; the method which comprises forming three continuously visible spot images on the screen of the cathode ray tube, producing control voltages from said receiver and said gyroscopic device, displacing the central spot image jointly by a control voltage produced by said gyroscopic device and control voltages produced by said receiver, and displacing the outer spot images jointly by another control voltage produced by said gyroscopic device and by control voltages produced by said receiver.

6. In the operation on an aircraft of guiding apparatus including a cathode ray tube, a receiver for crossed beams radiated from a landing field, a gyroscopic bank-and-climb device, and a radio homing compass receiver; the method which comprises forming three continuously visible spot images on the screen of the cathode ray tube, producing control voltages from said receivers and said gyroscopic device, controlling the horizontal displacement of the central spot image by the voltage produced by the homing compass receiver and the horizontal displacements of the outer spot images jointly by voltages produced by both receivers, and controlling the vertical displacements of all of the spot images jointly by voltages produced by the crossed-beams receiver and by said gyroscopic device.

7. In the operation on an aircraft of guiding apparatus including a cathode ray tube, a receiver for crossed beams radiated from a landing field, a gyroscopic bank-and-climb device, and alternatively operable directional devices comprising a gyroscopic direction indicating device and a radio homing compass receiver; the method which comprises forming three continuously visible spot images on the screen of the cathode ray tube, producing control voltages from said receivers and said gyroscopic devices, controlling the displacements of the central spot image jointly by voltages produced by the crossed-beams receiver and at least one of said devices, and controlling the displacements of the spot images jointly by voltages produced by said gyroscopic bank-and-climb device and by one of said directional devices.

8. In the operation on an aircraft of guiding apparatus including an electronic tube having a screen and voltage-controlled means for producing images on the screen, the method which comprises forming on the screen of the tube a first and a second image, the first image consisting of two laterally spaced spots, moving the first image vertically in accordance with the pitch angle of the aircraft and horizontally in accordance with the turn or yaw, moving the first image angularly in accordance with the bank of the aircraft, and moving the second image in accordance with the location of the aircraft with respect to a preselected path of travel.

9. In the operation on an aircraft of guiding apparatus including a cathode ray tube, the method which comprises forming a normally horizontal bar image and a second image on the screen of the cathode ray tube, displacing the bar image vertically in accordance with the pitch angle of the aircraft and horizontally in accordance with the turn or yaw, moving the bar image angularly in accordance with the bank of the aircraft, and moving the second image in accordance with the location of the aircraft with respect to a preselected path of travel.

10. Guiding apparatus on an aircraft comprising a cathode ray tube, means for producing a plurality of continuously visible images on said tube, a gyroscopic device on the aircraft including movable means for indicating an orientation factor, receiver means on the aircraft responsive to direction-indicating energy radiated from a landing field, and means energized by said gyroscopic device and said receiver means for jointly controlling the displacements of at least one of said images.

11. Guiding apparatus as claimed in claim 10, wherein said controlling means controls the displacements of all of said images in response jointly to the energy output of said receiver means and to the movement of said means of said gyroscopic device.

12. Guiding apparatus for use on an aircraft comprising a cathode ray tube having reference indicia on the screen thereof, means for producing a plurality of continuously visible images on the screen, receiver means responsive to energy radiated from a landing field to produce control voltages varying with the vertical and the horizontal position of the aircraft with respect to a preselected course to the field, gyroscopic means for producing direct current voltages varying in polarity and magnitude with the inclination of the longitudinal and transverse axes of the aircraft, direction indicating means for producing a direct current voltage varying in polarity and magnitude with the direction of travel of the aircraft with respect to the landing field, and means for controlling the displacement of said images with respect to the reference indicia in accordance with said voltages, said displacement controlling means including means which controls the position of one of said images jointly in accordance with voltages produced by said receiver means and with one of said direct current voltages.

13. Guiding apparatus as claimed in claim 12, wherein said image-producing means forms on the screen three spot images normally in horizontal alinement and symmetrically arranged on the cathode tube screen; and said displacement-controlling means controls the position of the central spot image in accordance with voltages produced by said receiver means and said direction indicating means, and the positions of the outer spot images in accordance with voltages produced by said gyroscopic means.

14. Guiding apparatus for producing on an aircraft a simulation of a direct view of three lights at a landing field, one light being at the desired ground contact point and the others being in the desired approach plane and symmetrically located with respect to the first light; said apparatus comprising a cathode ray tube, means for producing three continuously visible spot images on the screen of said tube, means for deflecting the central spot image vertically in accordance with the climb angle of the aircraft and the vertical displacement of the aircraft from the desired approach path, means for deflecting the central spot image horizontally in accordance with the direction of travel of the aircraft and its lateral displacement from the vertical plane of the runway of the field, and means for deflecting the outer spot images in accordance with the bank and the turn orientation of the aircraft.

15. Guiding apparatus as claimed in claim 14, wherein said means for deflecting the outer spots includes means for deflecting the same in accordance with the displacement of the aircraft from the desired approach path.

WILLIAM M. HALL.